United States Patent
Meister

Patent Number: 4,940,764
Date of Patent: Jul. 10, 1990

[54] WATER SOLUBLE GRAFT COPOLYMERS OF LIGNIN AND METHODS OF MAKING THE SAME

[76] Inventor: John J. Meister, 31675 Westlady Rd., Beverly Hills, Mich. 48010-5624

[21] Appl. No.: 286,534

[22] Filed: Dec. 19, 1988

[51] Int. Cl.$^5$ .............................................. C08H 5/02
[52] U.S. Cl. ................................................... 527/400
[58] Field of Search ...................... 525/54.4; 527/400

[56] References Cited

U.S. PATENT DOCUMENTS

| | | | |
|---|---|---|---|
| 3,985,659 | 10/1976 | Felicetta et al. | 252/8.5 A |
| 4,374,738 | 2/1983 | Kelley | 252/8.5 C |
| 4,391,719 | 7/1983 | Meister | 252/8.55 D |
| 4,521,578 | 6/1985 | Chen et al. | 526/288 |
| 4,676,317 | 6/1987 | Fry et al. | 166/293 |
| 4,703,801 | 11/1987 | Fry et al. | 166/293 |

*Primary Examiner*—Richard D. Lovering
*Assistant Examiner*—Gary L. Geist
*Attorney, Agent, or Firm*—Barnes, Kisselle, Raisch, Choate, Whittemore & Hulbert

[57] ABSTRACT

A water-soluble graft copolymer of lignin-(2-propenamide)-(2-methyl-N7,N7-dimethyl-7-ammonium-3-oxo-4-oxyoct-1-ene chloride or methylsulfate) having a central lignin network and at least one grafted side chain, R, having randomly repeating units of the formula:

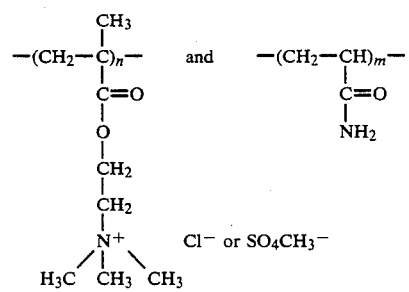

such that the central lignin network has a molecular weight of about 1,000 to 150,000 and the total number of randomly repeating units in the grafted side chain or chains is in the range of 50 to 300,000 such that the total copolymer molecular weight is in the range of 15,000 to 30,000,000.

24 Claims, No Drawings

WATER SOLUBLE GRAFT COPOLYMERS OF LIGNIN AND METHODS OF MAKING THE SAME

FIELD OF THE INVENTION

The present invention relates to water-soluble graft copolymers of lignin-(2-propenamide)-(2-methyl-N7,N7-dimethyl-7-ammonium-3-oxo-4-oxyoct-1-ene chloride or methylsulfate), methods of making the same and uses therefor.

BACKGROUND OF THE INVENTION

Aqueous solutions which flow at a controlled rate under a given shear stress are required throughout a variety of industrial applications. Such control of viscosity of water is achieved by adding to the water agents such as clays, large amounts of polar organic compounds such as polyacrylates or high concentrations of salts. These aqueous solutions suspend finely divided solids and will flow slowly when exposed to shear stress. Such solutions also flow more uniformly in situations where numerous paths, providing different resistances to flow, are open to the fluids.

However, each of these conventional agents has attendant disadvantages particularly when used to recover oil from subterranean wells. The application of these agents to flow control and flocculation-deflocculation control requires careful adjustment of the concentration of an active agent in the solution and control of adsorption of the active agent onto suspended solids or the matrix of the porous media. Such control is impossible when negatively charged agents are introduced into systems containing positively-charged surfaces such as calcite. The negatively-charged agents are completely adsorbed onto the solid. Further, if the solution contains divalent cations, the negatively-charged agents associate with the cations and precipitate. Hence, a need continues to exist for new agents which are capable of suitably thickening water and aqueous solutions to produce aqueous solutions having the desirable properties as outlined below but which are free of attendant disadvantages in the prior art agents.

SUMMARY OF THE INVENTION

A water-soluble graft copolymer of lignin-(2-propenamide)-(2-methyl-N7,N7-dimethyl-7-ammonium-3-oxo-4-oxyoct-1-ene chloride or methylsulfate) having a central lignin network and at least one grafted side chain, R, having randomly repeating units of the formulas:

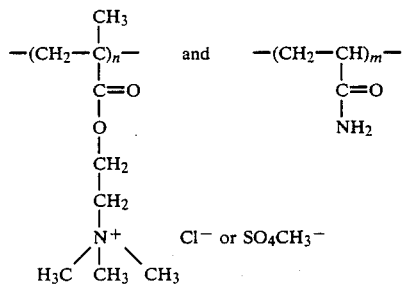

such that the central lignin network has a molecular weight of about 1,000 to 150,000 and the total number of random units in the grafted side chain or chains is in the range of 50 to 300,000 units, such that the total copolymer molecular weight is in the range of 15,000 to 30,000,000. The resulting molecule bears multiple positive charges.

Objects, features and advantages of the present invention are to provide a positively-charged lignin graft copolymer; provide simplistic and reliable processes for preparing such lignin graft copolymer; provide a method for using a positively-charged lignin graft copolymer in preparing highly viscous, aqueous solutions which are particularly useful in oil recovery from subterranean wells into carbonate reservoirs; and to provide a method of boosting or enhancing polymer molecular weights during polymerization reactions.

DETAILED DESCRIPTION

In accordance with the present invention, there is provided a high molecular weight graft copolymer containing lignin as the backbone network and poly((1-amidoethylene)-co-(1-methyl-1-(N5,N5-dimethyl-5-ammonium-1-oxo-2-oxyhexyl) ethylene)) with appropriate counter ion as the grafted side chain.

Lignin [8068-00-6] is derived from woody plants. In fact, after cellulose, it is the principal constituent of the woody structure of higher plants. Lignin, which makes up about 25% of the weight of dry wood, acts as a cementing agent to bind the matrix of cellulose fibers together into a rigid woody structure. See *Biochemistry* by A. L. Lehninger (Worth Publishers, 1970).

Moreover, lignin sources are abundant. Although the wood and bark waste from the lumber industry and wastes from agricultural operations could provide extremely large quantities of lignin, perhaps the most accessible, albeit smaller, source is the pulp and paper industry. For example, for 1978, it has been estimated that the U.S. chemical-pulp industry produced $1.55 \times 10^7$ metric tons of alkali lignin and $1.6 \times 10^6$ tons of lignosulfonic acids. See *Encyclopedia of Chemical Technology*, vol. 14 (Kirk-Othmer, 1981).

In general, the molecular structure of the repeating lignin units and the appropriate numbering thereof is as follows:

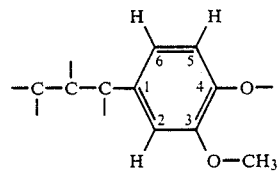

It appears that, regardless of origin, lignin [8068-00-6] is a complex, oxyphenylpropene polymer. In the natural state, lignin is a highly branched and partially cross-linked polymer. However, there appears to be some structural variation in branching depending upon whether the lignin is derived from coniferous or deciduous species or from bark, cambium, sapwood or heartwood. During recovery, the lignin is chemically altered and is available in relatively pure form as a derivative having a molecular weight of about 1,000 to 150,000. Suitable lignins which may be used according to the present invention are alkali lignins, HCl lignins, milled wood lignins (MWL) and 1,4-dioxane lignins, for example.

Alkali lignins are used in the examples of this application. However, reactions can be run on solvent-extracted lignin, kraft lignin, pine lignin, aspen lignin and steam-exploded lignin. Alkali lignins are tan, brown or black powders. When free of metal cations such as sodium or potassium, alkali lignins are water-insoluble materials and are commonly called "free acid" or "acid free" lignin. When containing metal cations, such as sodium or potassium, the alkali lignins are slightly water soluble materials which increase in water solubility as the pH increases from 7 toward 14 and become completely soluble in 5 wt. % aqueous sodium hydroxide solutions. Alkali lignins have, as a basic repeating unit, the oxyphenylpropyl unit:

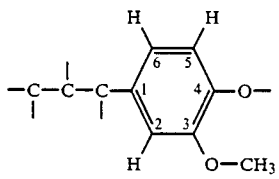

The aromatic ring is often alkoxy substituted, as shown, and the propene group often has a hydroxyl group attached in place of one hydrogen. Alkyl groups appear on some of the aromatic groups of the polymer and sulfur may be chemically bound to parts of the polymer, though few, if any, sulfonate groups occur.

Bonding between repeat units in alkali lignin is complex and involves carbon-carbon bonds between aromatic and/or alkyl carbons as well as ether bonds between aromatic and/or alkyl carbons. Labile hydrogens exist in the material and may be replaced by metal cations, such as sodium, potassium, calcium, or ammonium ions, to form alkali lignin salts. Alkali lignins are readily identified by method of production and are a familiar class of compounds to those versed in the paper making art.

In accordance with the present invention, to the lignin macromolecule, specifically to the oxyphenylpropene repeat unit, is grafted repeating units of 1-amido-ethylene:

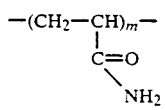

in combination with positively-charged repeating units of (1-methyl-1-(N5,N5,-dimethyl-5-ammonium-1-oxo-2-oxyhexyl) ethylene):

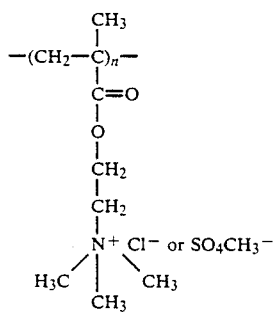

For example, when using alkali lignins in accordance with the present invention, a lignin graft copolymer of the following formula is produced:

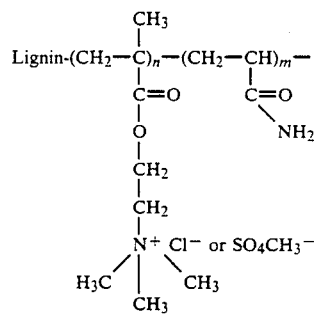

In this structural formula, the subscripts m and n are used to show that large numbers of the repeating units can be attached to the lignin backbone but the formula does not mean that these repeat units occur in strings of one type followed by strings of another type. Usually, the graft copolymers formed have random copolymer side chains with the two repeat units occurring in random sequence in the chain.

The preparation of this copolymer is accomplished, in general, under oxygen-free conditions by adding a redox initiator, a chloride salt, 2-propenamide, and 2-methyl-N7,N7-dimethyl-7-ammonium-3-oxo-4-oxyoct-1-ene chloride or methylsulfate,

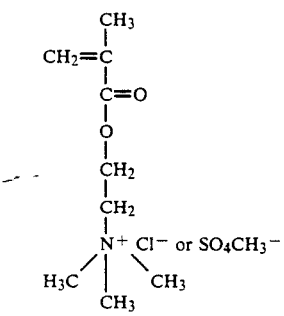

to a lignin dispersion in a suitable solvent and allowing time for graft polymerization to occur.

Preparation of alkali lignin-(2-propenamide)-(2-methyl-N7,N7-dimethyl-7-ammonium-3-oxo-4-oxyoct-1-ene chloride or methylsulfate) graft copolymer in dimethylsulfoxide will now be illustrated for a sample composed of between 0.32 and 3.0 weight percent lignin, 1.2 and 7.6 weight percent 2-propenamide, 0.1 to 11.0 weight percent 2-methyl-N7,N7-dimethyl-7-ammonium-3-oxo-4-oxyoct-1-ene (chloride or methylsulfate), 0.6 to 15.3 weight percent calcium chloride, 0.0 to 6.1 weight percent aqueous solution of cerium (+IV), and 60 to 97 weight percent solvent.

Significant variation in reaction mixture composition is possible as will be illustrated in the examples to follow. The synthesis method for these copolymers will now be described, generally.

As a suitable solvent for the graft copolymerization of the present invention, it should be noted that, in general, organic solvents are used and, of these, the polar, aprotic solvents are preferred. Particularly noteworthy are the solvents dimethyl sulfoxide (DMSO), dimethyl acetamide (DMAc), dimethyl formamide (DMF), 1,4-dioxane, 1-methyl-2-pyrrolidianone and pyridine. Of course, mixtures of these solvents can also be used such as 50/50 (vol/vol) mixtures of DMSO and 1,4-dioxane However, it is also possible to use various mixtures of the above solvents, such as a 50/50 (vol/vol) mixture of DMSO with water.

An aliquot of about 20 mL of purified solvent is placed in a 125 mL conical flask or stopperable test tube. Lignin and finely ground anhydrous calcium chloride are added to the pure solvent and the mixture is stirred for about 20 minutes while being bubbled with nitrogen. After 10 minutes of nitrogen saturation, a hydroperoxide such as hydrogen peroxide or 2-hydroperoxy-1,4-dioxycyclohexane is added to the reaction mixture. This addition can be made by adding an aqueous solution of the peroxide for safe handling or the peroxide can be added directly. Solid 2-propenamide and a nitrogen-saturated solution of 2-methyl-N7,N7-dimethyl-7-ammonium-3-oxo-4-oxyoct-1-ene chloride or methylsulfate in solvent are added while nitrogen gas is bubbled into the mixture. After about 10 minutes, a sufficient volume of 0.05M ceric sulfate in water may be added, the flask is sealed under nitrogen, and the slurry is stirred for 10 more minutes. The reaction starts immediately. The flask contents will often thicken slowly but may even solidify into a precipitate-laden, viscous slurry.

The reaction flask is placed in a 30° C. bath and allowed to sit for two days The reaction is then terminated with 0.5 mL of 1 wt % of hydroquinone in water. The reaction mixture is diluted with 100 mL of water and stirred until a uniform reaction product is precipitated by adding the dilute reaction mixture dropwise to 1 liter of 2-propanone or other suitable nonsolvent for the graft copolymer. The solid is recovered from 2-propanone by filtration and dried under vacuum at 40° C. To obtain a higher purity product which is more readily soluble, the reaction product is recovered from nonsolvent by filtration and redissolved in water. The same number of moles of disodium oxalate is added to the product as there were moles of calcium chloride in the reaction mixture to precipitate the calcium ion in the product. The aqueous solution with precipitate is dialyzed against pure water using a 3,500-upper-molecular-weight-permeable, dialysis membrane for several days. The polymer solution is centrifuged at 6000 rpm for 35 minutes to sediment the precipitate and the supernate, pure polymer solution is poured off. The aqueous solution containing the solid is then freeze-dried.

It is preferred that all reagents used be of reagent grade purity but less pure materials may be used if they do not contain inhibitors for the reaction. Other concentrations of cerium ($+IV$) ion solution in other nonreactive solvents can be used to add this reagent to the reaction and, indeed, this reagent is not necessary for the reaction. The 0.05M cerium ($+IV$) sulfate solution is stable and convenient to use. However, the concentration of the ceric sulfate solution used can vary from about 0.01M to 0.3M. Other reagents that may be used in place of a ceric ion ($Ce^{4+}$) include vanadium ($V^{+5}$) or manganese ions ($Mn^{3+}, Mn^{4+}, Mn^{7+}$). It is preferred that the metal salt be added as an aqueous solution. Moreover, ceric salts are a preferred reagent for the graft polymerization. The reaction can be run without adding cerium or other oxidizing metal ions but slightly higher yields and better solubility properties are obtained when the oxidizing metal ion is added. The graft copolymer can and will be produced if this reagent is not added to the synthesis mixture but product properties are improved by the addition of cerium ($+4$) solution. Other changes in this procedure, evident to those skilled in synthesis or chemical manufacture can be made. The graft copolymer can also be produced by adding nitrogen-saturated 2-propenamide to the reaction mixture in another solvent.

Other hydroperoxides, such as inorganic hydroperoxides or t-butyl hydroperoxide, may be used in place of the hydrogen peroxide listed above. The graft copolymerization reaction can be conducted with or without stirring once the monomer and metal salt have been dispersed in the reaction mixture. The reaction is allowed to proceed for 1 to 200 hours, with 48 hours being a typical reaction time. It is preferred to terminate the copolymerization by addition of a free radical scavenger such as hydroquinone.

The graft terpolymer is easily recovered from a liquid reaction mixture. If the reaction mixture is a gel or thick slurry, it can be made pourable by mixing therewith 1 to 3 times its volume of distilled or deionized water under low shear conditions until a homogeneous, pourable system is formed. The reaction mixture is added to 2–20, preferably 5–10, times its volume of a nonsolvent for the polymer, such as 2-propanone. Preferably the nonsolvent is stirred vigorously so as to form a vortex and the copolymer solution is slowly drained directly into the center of this vortex. The precipitated graft copolymer is then removed from the nonsolvent solution by filtration, washed with nonsolvent, filtered, and vacuum-dried to a constant weight. A purer product can be obtained by the dialysis-freeze drying process described above.

The following examples illustrate certain embodiments of this invention wherein parts and percentages are by weight and temperatures are in centigrade unless otherwise indicated. Indulin AT, a commercial lignin product of the Westvaco Corporation, and Eastman reageat-grade 2-propenamide were used in these synthesis. The compound 2-methyl-N7,N7-dimethyl-7-ammonium-3-oxo-4-oxyoct-1-ene chloride was obtained from Alcolac Specialty Chemicals of 3440 Fairfield Road, Baltimore, Md. 21226, as a 75 weight percent solution in water. It was purified by freeze drying to remove water and recrystallized from ethanol-(2-propanone)(20:80 mixture by volume). The purified crystals were dried under vacuum and stored in a freezer. The compound 2-methyl-N7,N7-dimethyl-7-ammonium-3-oxo-4-oxyoct-1-ene methylsulfate was obtained from CPS Chemical Company, Inc., of P.O. Box 162, Old Bridge, N.J. 08857, as an 80 weight percent solution in water. It was purified by freeze drying to remove water and recrystallized from ethanol-(2-propanone)(20:80 mixture by volume). The purified crystals were dried under vacuum and stored in a freezer. Paradioxane and dimethyl sulfoxide, of reagent grade, from Mallinckrodt Chemical Company and anhydrous calcium chloride also therefrom were used in these examples. Ceric sulfate solution was prepared from reagent grade ceric sulfate and distilled water. The hydroquinone solution was 1 wt % hydroquinone in distilled water. The limiting viscosity number of the product in pure water was determined using the Fuoss equation (a) to extrapolate several viscosity measurements, $\eta$, to zero polymer concentration.

$$C/\eta_{sp} = 1/[\eta] + Q_f C^{\frac{1}{2}}$$

Here $\eta_{sp} = (\eta - \eta_o)/\eta_o$, C is polymer concentration in g/dL, $Q_f$ is a fitting constant, and $[\eta]$ is limiting viscosity number. See *J. Poly. Sci.*, 3,603–604 (1948).

The present invention will now be further illustrated by certain examples and references which are provided for purposes of illustration only and are not intended to limit the present invention.

Yield was calculated from the formula: (g=grams)

$$\text{weight percent yield} = \frac{(\text{g polymer recovered})}{\text{g lignin added} + \text{g monomer added}}$$

EXAMPLES

Example 1

A total of 0.5 g of lignin and 0.38 g of calcium chloride were placed in a 125 mL test tube containing 20.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 2 more minutes, the system was stirred for about 20 minutes, and 1.40 g of 2-propenamide (I) was then added. After about 2 minutes of stirring and $N_2$ bubbling, 1.18 g of 2-propenamide (I) and 1.94 g of 2-methyl-N7,N7-dimethyl-7-ammonium-3-oxo-4-oxyoct-1-ene chloride (II) in 11.08 g of dimethylsulfoxide were added. After 10 minutes of stirring and bubbling $N_2$ through the reaction mixture, the flask was stoppered and placed in a 30° C. bath for 2 days. The mole ratio of monomer I to II in the reaction solution was 4 to 1. The chloride content of the reaction mixture was 1.554 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.46 g of disodium oxalate was added to the produce to precipitate the calcium ion in the product. The aqueous solution with precipitate was dialyzed against pure water using a 3,500-upper-molecular-weight-permeable, dialysis membrane from 3 days. The polymer solution was centrifuged at 6000 rpm for 35 minutes to sediment the precipitate and the supernate, pure polymer solution was poured off. The dilute reaction product from the dialysis tube was recovered by freeze drying and found to weigh 4.59 g. The product was labeled 24-136-1. Yield=91.43 wt %. The nitrogen content of the product was 11.62 weight percent. Limiting viscosity number, $[\eta]$, of the product was 13.07 dL/g.

Example 2

A total of 0.5 g of lignin and 0.26 g of calcium chloride were placed in a 125 mL test tube containing 20.0 g of dimethylsulfoxide. The mixture was stir-bubbled with nitrogen ($N_2$) for about 2 minutes before 0.50 mL of 30 percent, aqueous hydrogen peroxide were added to the reaction mixture. $N_2$ was bubbled through the reaction mixture for about 2 more minutes, the system was stirred for about 20 minutes, and 1.40 g of 2propenamide (I) was then added. After about 2 minutes of stirring and $N_2$ bubbling, 0.85 g of 2-propenamide (I) and 2.82 g of 2-methyl-N7,N7-dimethyl-7-ammonium-3-oxo-4-oxyoct-1-ene chloride (II) in 14.82 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 7 to 3. The chloride content of the reaction mixture was 1.570 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.32 g of disodium oxalate was added to the product to precipitate the calcium ion in the product. The aqueous solution with precipitate was dialyzed against pure water for 3 days. The polymer solution was centrifuged at 6000 rpm for 35 minutes to sediment the precipitate and the supernate, pure polymer solution was poured off. The dilute reaction product from the dialysis tube was recovered by freeze drying and found to weight 5.24 g. The product was labeled 24-136-2. Yield=94.07 wt %. The nitrogen content of the product was 10.36 weight percent. Limiting viscosity number, $[\eta]$, of the product was 16.07 dL/g.

Example 3

A total of 0.5 g of lignin and 0.11 g of calcium chloride were placed in a 125 mL test tube containing 20.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 2 more minutes, the system was stirred for about 20 minutes, and 1.41 g of 2propenamide (I) was then added. After about 2 minutes of stirring and $N_2$ bubbling, 0.52 g of 2-propenamide (I) and 3.73 g of 2-methyl-N7,N7-dimethyl-7-ammonium-3-oxo-4-oxyoct-1-ene chloride (II) in 19.40 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 3 to 2. The chloride content of the reaction mixture was 1.534 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.13 g of disodium oxalate was added to the product to precipitate the calcium ion in the product. The aqueous solution with precipitate was dialyzed against pure water for 3 days. The polymer solution was centrifuged at 6000 rpm for 35 minutes to sediment the precipitate and the supernate, pure polymer solution was poured off. The dilute reaction product from the dialysis tube was recovered by freeze drying and found to weigh 5.62 g. The product was labeled 24-136-3. Yield=91.23 wt %. The nitrogen content of the product was 9.09 weight percent. Limiting viscosity number, $[\eta]$, of the product was 39.84 dL/g.

Example 4

A total of 0.5 g of lignin and 0.01 g of calcium chloride were placed in a 125 mL test tube containing 20.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 2 more minutes, the system was stirred for about 20 minutes, and 1.40 g of 2-propenamide (I) was then added. After about 2 minutes of stirring and $N_2$ bubbling, 0.21 g of 2-propenamide (I) and 4.67 g of 2-methyl-N7,N7-dimethyl-7-ammonium-3- oxo-4-oxyoct-1-ene chloride (II) in 25.31 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction mixture was 1 to 1. The chloride content of the reaction mixture was 1.530 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.01 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 6.15 g. The product was labeled 24-136-4. Yield=90.71 wt %. The nitrogen content of the product was 7.76 weight percent. Limiting viscosity number, $[\eta]$, of the product was 39.85 dL/g.

Note that these four examples, numbers 1 to 4, show that different mole ratios of monomers can be used to produce product in yields in excess of 90 weight percent if the chloride ion content of the reaction mixture is maintained at between 1.53 and 1.57 weight percent. This optimum chloride ion content must be found for a given solvent system by experimental tests. It is maintained by lowering the amount of calcium chloride added to the reaction to compensate for the amount of chloride ion contained in the positively charged monomer.

Example 5

A total of 0.51 g of lignin and 0.88 g of calcium chloride were placed in a 125 mL test tube containing 10.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 2 more minutes, the system was stirred for about 20 minutes, and 1.39 g of 2propenamide (I) in 10.0 g of dimethylsulfoxide was then added. After about 2 minutes of stirring and $N_2$ bubbling, 1.17 g of 2-propenamide (I) and 2.55 g of 2-methyl-N7,N7-dimethyl-7-ammonium-3-oxo-4-oxyoct-1-ene methylsulfate (II) in 10.08 g of dimethylsulfoxide were added. After 10 minutes of stirring and bubbling $N_2$ through the reaction mixture, the flask was stoppered and placed in a 30° C. bath for 2 days. The mole ratio of monomer I to II in the reaction solution was 4 to 1. The chloride content of the reaction mixture was 1.519 weight percent. The solids content of the reaction mixture was 18.89 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 1.06 g of disodium oxalate was added to the product to precipitate the calcium ion in the product. The aqueous solution with precipitate was dialyzed against pure water using a 3,500-upper-molecular-weight-permeable, dialysis membrane for 3 days. The polymer solution was centrifuged at 6000 rpm for 35 minutes to sediment the precipitate and the supernate, pure polymer solution was poured off. The dilute reaction product from the dialysis tube was recovered by freeze drying and found to weigh 4.34 g. The product was labeled 24-139-1. Yield=77.22 wt %. Limiting viscosity number, $[\eta]$, of the product was 5.07 dL/g.

Example 6

A total of 0.50 g of lignin and 0.93 g of calcium chloride were placed in a 125 mL test tube containing 10.0 g of dimethylsulfoxide. The mixture was stir-bubbled with nitrogen ($N_2$) for about 2 minutes before 0.50 mL of 30 percent, aqueous hydrogen peroxide were added to the reaction mixture. $N_2$ was bubbled through the reaction mixture for about 2 more minutes, the system was stirred for about 20 minutes, and 1.39 g of 2-propenamide (I) in 10.0 g of dimethylsulfoxide was then added. After about 2 minutes of stirring and $N_2$ bubbling, 0.53 g of 2-propenamide (I) and 5.15 g of 2-methyl-N7,N7-dimethyl-7-ammonium-3-oxo-4-oxyoct-1-ene methylsulfate (II) in 10.72 g of dimethylsulfoxide were added. After 10 minutes of stirring and bubbling $N_2$ through the reaction mixture, the flask was stoppered and placed in a 30° C. bath for 2 days. The mole ratio of monomer I to II in the reaction solution was 3 to 2. The chloride content of the reaction mixture was 1.500 weight percent. The calcium chloride content was 2.34 weight percent. The solids content of the reaction mixture was 22.66 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 1.12 g of disodium oxalate was added to the product to precipitate the calcium ion in the product. The aqueous solution with precipitate was dialyzed against water for 3 days. The polymer solution was centrifuged at 6000 rpm for 35 minutes to sediment the precipitate and the supernate, pure polymer solution was poured off. The dilute reaction product from the centrifugation was recovered by freeze drying and found to weigh 6.07 g. The product was labeled 24-139-2. Yield=80.18 wt %. Limiting viscosity number, $[\eta]$, of the product was 23.41 dL.

Example 7

A total of 0.50 g of lignin and 0.99 g of calcium chloride were placed in a 125 mL test tube containing 10.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 5 more minutes. Then 1.29 g of 2-propenamide (I) and 8.36 g of 2-methyl-N7,N7-dimethyl-7-ammonium-3-oxo-4-oxyoct-1-ene methylsulfate (II) in 19.28 g of dimethylsulfoxide were added. After 10 minutes of stirring and bubbling $N_2$ through the reaction mixture, the flask was stoppered and placed in a 30° C. bath for 2 days. The mole ratio of monomer I to II in the reaction solution was 2 to 3. The chloride content of the reaction mixture was 1.547 weight percent. The calcium chloride content was 2.42 weight percent. The solids content of the reaction mixture was 28.45 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 1.19 g of disodium oxalate was added to the product to precipitate the calcium ion in the product. The aqueous solution with precipitate was dialyzed against water for 3 days. The polymer solution was centrifuged to sediment the precipitate and the supernate, pure polymer solution was poured off. The dilute reaction product from the centrifugation was recovered by freeze drying and found to weigh 7.15 g. The product was labeled 24-139-3. Yield=70.44 wt %. Limiting viscosity number, $[\eta]$, of the product was 41.73 dL/g.

Example 8

A total of 0.50 g of lignin and 1.02 g of calcium chloride were placed in a 125 mL test tube containing 10.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 5 more minutes. Then 0.64 g of 2-propenamide (I) and 10.21 g of 2-methyl-N7,N7-dimethyl-7-ammonium-3-oxo-4-oxyoct-1-ene methylsulfate (II) in 21.40 g of dimethylsulfoxide were added. After 10 minutes of stirring and bubbling $N_2$ through the reaction mixture, the flask was stoppered and placed in a 30° C. bath for 2 days. The mole ratio of monomer I to II in the reaction solution was 1 to 4. The chloride content of the reaction mixture was 1.474 weight percent. The calcium chloride content was 2.304 weight percent. The solids content of the reaction mixture was 29.07 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 1.23 g of disodium oxalate was added to the product to precipitate the calcium ion in the product. The aqueous solution with precipitate was dialyzed against water for 3 days. The polymer solution was centrifuged to sediment the precipitate and the supernate, pure polymer solution was poured off. The dilute reaction product from the centrifugation was recovered by freeze drying and found to weigh 10.33 g. The product was labeled 24-139-4. Yield=91.40 wt %. Limiting viscosity number, $[\eta]$, of the product was 55.03 dL/g.

Note that these reactions, examples 5 to 8, yield more than 80 weight percent product but yields are not as high as those of examples 1 to 4. Thus, these reactions, while not run at an optimum concentration of chloride ion in the reaction mixture, still produce a large yield of graft polymer. Further, these products also have different amounts of charged and uncharged repeat units in the product and that difference is produced by varying the monomer ratio between the two repeat units.

Example 9

A total of 0.50 g of lignin and 1.07 g of calcium chloride were placed in a 125 mL test tube containing 10.0 g of dimethylsulfoxide. The mixture was stir-bubbled with nitrogen ($N_2$) for about 2 minutes before 0.50 mL of 30 percent, aqueous hydrogen peroxide was added to the reaction mixture. $N_2$ was bubbled through the reaction mixture for about 5 more minutes. Then 12.77 g of 2-methyl-N7,N7-dimethyl-7-ammonium-3-oxo-4-oxyoct-1-ene methylsulfate (II) in 21.40 g of dimethylsulfoxide was added. After 10 minutes of stirring and bubbling $N_2$ through the reaction mixture, the flask was stoppered and placed in a 30° C. bath for 2 days. The mole ratio of monomer I to II in the reaction solution was 0 to 100. This sample utilized only II monomer to form poly(lignin-g-(1-methyl-1-(N5,N5-dimethyl-5-ammonium-1-oxo-2-oxyhexyl)ethylene methylsulfate)), a graft copolymer with a one repeat unit sidechain. The chloride content of the reaction mixture was 1.503 weight percent. The calcium chloride content was 2.350 weight percent. The solids content of the reaction mixture was 32.58 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 1.29 g of disodium oxalate was added to the product to precipitate the calcium ion in the product. The aqueous solution with precipitate was dialyzed against water for 3 days. The polymer solution was centrifuged to sediment the precipitate and the supernate, pure polymer solution was poured off. The dilute reaction product from the centrifugation was recovered by freeze drying and found to weigh 9.40 g. The product was labeled 24-139-5. Yield=70.91 wt %. Limiting viscosity number, $[\eta]$, of the product was 85.64 dL/g.

The product of Example 9 is poly(lignin-co-(1-methyl-1-(N5,N5-dimethyl-5-ammonium-1-oxo-2-oxyhexyl)ethylene)), a graft copolymer with all charged repeat units in the sidechain.

The data of the following Table I shows that the products of this invention are effective viscosifiers for water.

TABLE 1

Viscosities of Aqueous Solutions of Graft Terpolymer

| Product from Example Number | Sample Number | *Viscosity when product concentration in water is (wt %): | | | | |
|---|---|---|---|---|---|---|
| | | 1.0 | 0.298 | 0.199 | 0.0997 | 0.050 |
| 9 | 24-139-5 | — | 5.115 | 4.373 | 3.182 | 2.323 |
| | | 0.300 | 0.197 | 0.1003 | 0.0501 | 0.025 0.0099 |
| 8 | 24-139-4 | 4.424 | 3.618 | 2.749 | 2.013 | 1.481 1.108 |
| | | 0.1 | 0.0747 | 0.037 | 0.015 | 0.0099 |
| 7 | 24-139-3 | 1.904 | 1.918 | 1.501 | 1.134 | 1.019 |
| | | 0.102 | 0.0597 | 0.030 | 0.0100 | |
| 6 | 24-139-2 | 1.557 | 1.321 | 1.113 | 0.923 | |
| | | 0.298 | 0.154 | 0.102 | 0.0703 | |
| 5 | 24-139-1 | 1.413 | 1.166 | 1.057 | 0.958 | |
| | | 1.0 | 0.322 | 0.165 | 0.0997 | 0.0502 |
| 4 | 24-136-4 | — | 4.99 | 3.463 | 2.687 | 1.859 |
| | | 0.252 | 0.198 | 0.1014 | 0.0508 | 0.0271 |
| 3 | 24-136-3 | 2.886 | 2.617 | 2.024 | 1.567 | 1.423 |
| | | 1.0 | 0.303 | 0.199 | 0.0981 | 0.0491 |
| 2 | 24-136-2 | — | 2.766 | 2.179 | 1.572 | 1.271 |
| | | 1.0 | 0.393 | 0.299 | 0.199 | |

TABLE 1-continued

| | | Viscosities of Aqueous Solutions of Graft Terpolymer | | | | |
|---|---|---|---|---|---|---|
| Product from Example Number | Sample Number | *Viscosity when product concentration in water is (wt %): | | | | |
| | | 1.0 | 0.298 | 0.199 | 0.0997 | 0.050 |
| 1 | 24-136-1 | — | 2.722 | 2.359 | 1.949 | |

*All viscosities are in centipoise, the temperature of the solution is 30° C., and all solutions were made in distilled water. Viscosity of pure water at 30° C. = 0.7975 cp.

By increasing the viscosity and lowering the mobility of water, these compositions allow more oil to be recovered by waterflooding. The lower mobility water pushes more oil ahead of it to a production well because it has a lower tendency to flow than the oil. This capacity to lower water mobility is a major asset in increasing oil production, as is well known in the art of waterflooding.

Example 10

A total of 0.672 g of lignin and 0.335 g of calcium chloride were placed in a 125 mL test tube containing 10.0 g of dimethylsulfoxide. The mixture was stir-bubbled with nitrogen ($N_2$) for about 2 minutes before 0.65 mL of 30 percent, aqueous hydrogen peroxide was added to the reaction mixture. $N_2$ was bubbled through the reaction mixture for about 5 more minutes and 1.410 g of 2-propenamide (I) in 10 g of dimethylsulfoxide was then added. After about 2 minutes of stirring and $N_2$ bubbling, 1.22 g of 2-propenamide (I) and 0.83 g of 2-methyl-N7,N7-dimethyl-7-ammonium-3-oxo-4-oxyoct-1-ene chloride (II) in 10.85 g of dimethylsulfoxide were added. After about 10 minutes of stirring and bubbling $N_2$ through thereaction mixture, the flask was stoppered and placed in a 30° C. bath for 2 days. The mole ratio of the monomer I to II in the reaction solution was 9 to 1. The calcium chloride content was 0.94 weight percent. The solids content of the reaction mixture was 11.25 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 3.25 g. The product was labeled 24117-2. Yield=86.32 wt %. The nitrogen content of the product was 13.16 weight percent. The chloride content of the product was 0.92 weight percent. Limiting viscosity number, $[\eta]$, of the product was 2.86 dL/g.

Example 11

A total of 0.678 g of lignin and 0.338 g of calcium chloride were placed in a 125 mL test tube containing 10.0 g of dimethylsulfoxide. The mixture was stir-bubbled with nitrogen ($N_2$) for about 2 minutes before 0.65 mL of 30 percent, aqueous hydrogen peroxide were added to the reaction mixture. $N_2$ was bubbled through the reaction mixture for about 4 more minutes and 1.40 g of 2-propenamide (I) in 10 g of dimethylsulfoxide was then added. After about 2 minutes of stirring and $N_2$ bubbling, 0.87 g of 2-propenamide (I) and 1.68 g of 2-methyl-N7,N7-dimethyl-7-ammonium-3-oxo-4-oxyoct-1-ene chloride (II) in 25.31 g of dimethylsulfoxide were added. After about 10 minutes of stirring and bubbling $N_2$ through the reaction mixture, the flask was stoppered and placed in a 30° C. bath for 2 days. The mole ratio of monomer I and II to the reaction solution was 4 to 1. The chloride content of the reaction mixture was 1.37 weight percent. The calcium chloride content was 0.92 weight percent. The solids content of the reaction mixture was 12.98 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 3.86 g. The product was labeled 24-117-3. Yield=83.43 wt %. The nitrogen content of the product was 10.69 weight percent. The chloride content of the product was 3.02 weight percent. Limiting viscosity number, $[\eta]$, of the product was 7.09 dL/g.

Example 12

A total of 0.678 g of lignin and 0 338 g of calcium chloride were placed in a 125 mL test tube containing 10.0 g of dimethylsulfoxide. The mixture was stir-bubbled with nitrogen ($N_2$) for about 2 minutes before 0.65 mL of 30 percent, aqueous hydrogen peroxide was added to the reaction mixture. $N_2$ was bubbled through the reaction mixture for about 2 more minutes and 1.41 g of 2-propenamide (I) in 10 g of dimethylsulfoxide was then added. After about 2 minutes of stirring and $N_2$ bubbling, 0.29 g of 2-propenamide (I) and 3.33 g of 2-methyl-N7,N7-dimethyl-7-ammonium-3-oxo-4-oxyoct-1-ene chloride (II) in 27.85 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 3 to 2. The chloride content of the reaction mixture was 1.44 weight percent. The calcium chloride content was 0.62 weight percent. The solids content of the reaction mixture was 10.66 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 4.122 g. The product was labeled 24-117-4. Yield=72.22 wt %. The nitrogen content of the product was 7.23 weight percent. The chloride content of the product was 5.97 weight percent. Limiting viscosity number, [$\eta$], of the product was 12.99 dL/g.

Example 13

A total of 0.672 g of lignin and 0.335 g of calcium chloride were placed in a 125 mL test tube containing 15.0 g of dimethylsulfoxide. The mixture was stir-bubbled with nitrogen ($N_2$) for about 3 minutes before 0.65 mL of 30 percent, aqueous hydrogen peroxide were added to the reaction mixture. $N_2$ was bubbled through the reaction mixture for about 3 more minutes and 1.12 g of 2-propenamide (I) in 15 g of dimethylsulfoxide was then added. After about 2 minutes of stirring and $N_2$ bubbling, 4.93 g of 2-methyl-N7,N7-dimethyl-7-ammonium-3-oxo-4-oxyoct-1-ene chloride (II) in 32.89 g of dimethylsulfoxide were added. After about 10 minutes of stirring and bubbling $N_2$ through the reaction mixture, the flask was stoppered and placed in a 30° C. bath for 2 days. The mole ratio of monomer I to II in the reaction solution was 2 to 3. The chloride content of the reaction mixture was 1.50 weight percent. The calcium chloride content was 0.47 weight percent. The solids content of the reaction mixture was 9.65 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 2.71 g. The product was labeled 24-117-5. Yield=40.31 wt %. The nitrogen content of the product was 6.19 weight percent. Limiting viscosity number, [$\eta$], of the product was 7.3 dL/g.

Examples 10 to 13 show that very different ratios of monomers can be used to produce high yields of copolymer with this art. Example 10 has a monomer I to II ratio of 9 to 1, significantly higher than that of all other examples. Examples 11 to 13 show that chloride ion concentration can very from below 1.37 weight percent (example 11) of the reaction mixture to over 1.50 weight percent (example 13) with copolymer still produced from the reaction. The calcium chloride content of these reactions also varies from 0.92 weight percent (example 11) to 0.47 weight percent (example 13) with product still produced in the reaction. The process for making these materials is thus flexible and versatile.

Example 14

A total of 0.672 g of lignin and 0.335 g of calcium chloride were placed in a 125 mL test tube containing 8.0 g of dimethylsulfoxide. The mixture was stir-bubbled with nitrogen ($N_2$) for about 2 minutes before 0.65 mL of 30 percent, aqueous hydrogen peroxide was added to the reaction mixture. $N_2$ was bubbled through the reaction mixture for about 2 more minutes and 0.29 g of 2-propenamide (I) in 8 g of dimethylsulfoxide was then added. After about 2 minutes of stirring and $N_2$ bubbling, 7.40 g of 2-methyl-N7,N7-dimethyl-7-ammonium-3-oxo-4-oxyoct-1-ene chloride (II) in 12.02 g of dimethylsulfoxide and 3.18 g of water were added. After about 10 minutes of stirring and bubbling $N_2$ through the reaction mixture, the flask was stoppered and placed in a 30° C. bath for 2 days. The mole ratio of monomer I to II in the reaction solution was 1 to 9. The chloride content of the reaction mixture was 3.65 weight percent. The calcium chloride content was 0.83 weight percent. The solids content of the reaction mixture was 23.05 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 7.80 g. The product was labeled 24-117-7. Yield=93.27 wt %. The nitrogen content of the product was 5.68 weight percent. The chloride content of the product was 10.65 weight percent. Limiting viscosity number, [$\eta$], of the product was 34.97 dL/g.

Example 15

A total of 0.678 g of lignin and 0.338 g of calcium chloride were placed in a 125 mL test tube containing 7.0 g of dimethylsulfoxide. The mixture was stir-bubbled with nitrogen ($N_2$) for about 2 minutes before 0.65 mL of 30 percent, aqueous hydrogen peroxide was added to the reaction mixture. $N_2$ was bubbled through the reaction mixture for about 2 more minutes. After about 2 minutes of stirring and $N_2$ bubbling, 8.21 g of 2-methyl-N7,N7-dimethyl-7-ammonium-3-oxo-4-oxyoct-1-ene chloride (II) in 19.67 g of dimethylsulfoxide and 3.55 g of water were added. After about 10 minutes of stirring and bubbling $N_2$ through the reaction mixture, the flask was stoppered and placed in a 30° C. bath for 2 days. The mole ratio of monomer I to II in the reaction solution was zero to 100. This sample utilized only II monomer to form poly(lignin-g-(1-methyl-1(N5,N5-dimethyl-5-ammonium-1-oxo-2-oxyhexyl)ethylene chloride)), a graft copolymer with a one repeat unit sidechain. The chloride content of the reaction mixture was 4.04 weight percent. The reaction was then terminated by adding 0.5 mL of 1% hydroquinone and 100 mL of water thereto. The stirred reaction mixture was precipitated in ½ L of 2-propanone and recovered by filtration. The recovered solid was dissolved in 100 mL of water and 0.41 g of disodium oxalate was added to the product to precipitate the calcium ion in the product. The aqueous solution with precipitate was dialyzed against pure water for 3 days. The polymer solution was centrifuged and the supernate, pure polymer solution was poured off. The dilute reaction product from the dialysis tube was recovered by freeze drying and found to weigh 8.55 g. The product was labeled 24-117-8. Yield=96.2 wt %. The nitrogen content of the product was 5.49 weight percent. Limiting viscosity number, [$\eta$], of the product was 36.63 dL/g.

Examples 14 and 15 illustrate that much higher molecular weight copolymers can be made by these methods by altering the solvent mixture. The addition of water in these reaction causes high monomer II reactions to produce high molecular size, high molecular weight copolymers in high yield. Thus, a solvent mixture can be used to increase yield and increase molecular size by choosing a solvent mixture which is sufficiently polar so as to dissolve completely all of the monomer to be added to the lignin. Further, example 14 shows again that very different ratios of monomers can be used to produce high yields of copolymer. Example 14 has a monomer I to II ratio of 1 to 9, significantly lower than that of all other examples. Examples 10 and 14 thus demonstrate the extreme versatility of this art in producing product from monomer mixtures of extremely different composition.

As already noted, the grafted side chain or chains are made of random units of 2-propenamide and 2-methyl-N7,N7-dimethyl-7-ammonium-3-oxo-4-oxyoct-1-ene chloride or methylsulfate. Of course, suitable counter anions other than chloride or methylsulfate, such as bromide, nitrate or bicarbonate, are considered within the scope of the present invention. Moreover, the actual content of the grafted side chain or chains depends upon the molar ratio of monomer reactants employed. According to the present invention, it is acceptable to use from about 0 molar % to 99 molar % of 2-propenamide to about 100 molar % to 1 molar % of 2-methyl-N7,N7-dimethyl-7-ammonium-3-oxo-4-oxyoct-1-ene chloride or methylsulfate. However, it is preferable to use a molar % in the range of 20 to 80 or 80 to 20, of monomer I to II, respectively. The grafted side chain or chains appear to occur at one or more of the 2-, 5- or 6-aromatic ring positions on the oxyphenylpropene moiety.

Of course, the precise content of the grafted side chain or chains depends upon the contemplated use. For example, in uses where water solubility is required, more of the cationic monomer should be used. Conversely, where less ionic character is desired, more of the 2-propenamide monomer should be used.

weights of about 15,000 to 300,000. Under these conditions, the polymer molecular weight is generally increased by increasing the ratio of moles of monomer to moles of hydroperoxide. The converse is true when diminishing the molecular weight. However, by utilizing another aspect of the present invention, it has now been found possible to greatly boost or increase the molecular weight of the growing polymer during polymerization by conducting the reaction essentially in a gelated state.

Generally, the gelated state can be formed by essentially repeating the procedures already described for synthesizing the graft copolymer, but by reducing the amount of dimethylsulfoxide (DMSO) solvent by a factor of 0.25 or more. In other words, instead of using about 30 mL of solvent for the reaction as described in the Examples, about 23 or less mL is used instead. It has been theorized that by conducting the polymerization reaction in the gelated state, the propagation reaction continues, while the termination reaction is greatly diminished. It is also possible that the higher concentration of backbone and repeat units allows crosslinking in these lower solvent content reactions. In general, the gelatin occurs at room temperature without the addition of heat. Reaction times are somewhat variable and on the order of from 1 to about 48 hours with reaction yields as high as 80 weight percent possible in about 1 hour. The preferred reaction time in a commercial or continuous process of manufacture of the copolymer is 1 to 2 hours.

Although the polymerization reaction of the present invention is a free-radical polymerization, the scope of the present invention clearly extends the concept of gel-state reactions to other types of polymerization reactions such as anionic or cationic chain polymerizations or step polymerizations.

The water-soluble lignin graft copolymer of the present invention is advantageously used as a thickening agent for water or aqueous solutions and can be used in the preparation and use of drilling fluid compositions. In this respect, U.S. Pat. Nos. 3,985,659, 4,322,301 and 4,342,645 are herein incorporated by reference in their

TABLE 2

Results of Other Reactions Using this Technology
poly(lignin-g-((1-amidoethylene)-co-(1-methyl-1-(N5,N5-dimethyl-5-ammonium-1-oxo-2-oxyhexyl)ethylene chloride))

| Example Number | Sample Number | WEIGHT IN GRAMS | | | | VOLUME (ML) | | Yield (wt %) |
|---|---|---|---|---|---|---|---|---|
| | | Lignin | Calcium Chloride | Monomer I | Monomer II | Dimethyl Sulfoxide | Hydrogen Peroxide | |
| 16 | 24-44-1 | .671 | 0.335 | 2.26 | 1.58 | 29.41 | 0.65 | 63.4 |
| 17 | 24-44-2 | .678 | 0.338 | 1.62 | 3.17 | 29.37 | 0.65 | 61.83 |
| 18 | 24-44-3 | .671 | 0.335 | 1.34 | 4.74 | 29.16 | 0.65 | 69.62 |
| 19 | 24-44-4 | .683 | 0.341 | 0.63 | 6.36 | 29.34 | 0.65 | 67.78 |
| 20 | 24-44-5 | .671 | 0.335 | — | 7.84 | 29.42 | 0.65 | 32.19 |

Examples 16 to 20 illustrate again the wide diversity of monomer ratios which will produce copolymer product of this invention. Examples 16 to 20 also illustrate that constant levels of chloride ion in a series of reactions of differing monomer ratio will produce product but that yield, which in these cases varies from 32 to 69.6 weight percent, may be reduced.

The molecular weight of the water-soluble lignin copolymers of the present invention are in the range of about 1,000 to about 30,000,000 as determined by size exclusion chromatography using known techniques. Under the process conditions of the present invention already described, it is possible to obtain molecular entirety. Further, the water-soluble lignin graft copolymer of the present invention is positively charged and therefore is only minimally adsorbed onto the surfaces of carbonate reservoirs comprised of dolomite or calcite rock. Before this invention, in the prior art such adsorption was a major deterrent to the use of water soluble polymers in carbonate rock for oil mobilization.

The water-soluble lignin graft copolymers of the present invention can also be used advantageously in a conventional manner for the enhanced recovery of oil in subterranean wells. Typically in such processes, the graft copolymer is dispersed or solubilized in injection water, the water is then injected into the subterranean formation, and the injected water is then moved through the formation acting as a hydraulic ram, thereby pushing the resident oil to a product well. It is noted that the particular amounts of the present lignin graft copolymer effective for such use as well as other particulars of this use would be within the knowledge of one skilled in the art having read the present disclosure. In general, such determinations and the technique of polymer flooding is based on mobility:

$$Mobility = K_f/M_f$$

wherein: K is the permeability of the rock or oil reservoir to the fluid, $f$, and wherein $M_f$ is the viscosity of the fluid, $f$. Thus, the mobility of the oil is $K_o/M_o$ and the mobility of the polymer solution is Kp/Mp. For effective flooding, the mobility ratio of the polymer solution to the oil $(K_p/M_p)/(K_o/M_o)$ to be moved must be 1.0 or greater. The preferred range is 1.05 to 1.8.

This invention was made with government support under CBT-84-17876/CBT-86-96158 awarded by the National Science Foundation. The government has certain rights in this invention.

Having now fully described this invention, it will be apparent to one of ordinary skill in the art that many changes and modifications can be made thereto without departing from the spirit or scope of the invention as set forth herein.

I claim:

1. A positively-charged water-soluble graft copolymer of lignin with an anion, having a central lignin network and at least one grafted side chain having randomly repeating units of the formulas:

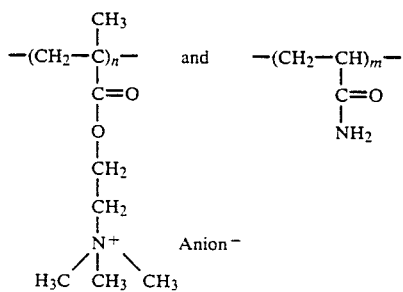

wherein the ratio of such repeating units range from about one molar percent to about 100 molar percent, and from about zero molar percent to about 99 molar percent, respectively, such that the central lignin network has a molecular weight of about 1,000 to 150,000 and the total number of randomly repeating units in the grafted side chain or chains is in the range of 50 to 300,000 units, and such that the total graft copolymer molecular weight is in the range of 15,000 to 30,000,000.

2. A copolymer as called for in claim 1, wherein said lignin used as the central network is selected from the group consisting of alkali lignin, HCl lignin, milled-wood lignin and 1,4-dioxane lignin.

3. A copolymer as called for in claim 1, wherein said anion is selected from a group consisting of chloride, methylsulfate, bromide, nitrate and bicarbonate.

4. A method of preparing a positively-charged water-soluble graft copolymer of lignin which comprises free radically graft copolymerizing 2-propenamide and 2-methyl-N7,N7-dimethyl-7-ammonium-3-oxo-4-oxyoct-1-ene with a neutralizing anion on lignin.

5. A method as called for in claim 4, wherein said step of copolymerizing comprises:
(a) adding a hydroperoxide to a solvent; and
(b) adding lignin, a chloride-containing salt, 2-propenamide and 2-methyl-N7,N7-dimethyl-7-ammonium-3-oxo-4-oxyoct-1-ene chloride or methylsulfate to said solvent, thereby initiating free radical polymerization.

6. A method as called for in claim 5 wherein the components are added in sufficient quantity such that the chloride ion concentration of the reaction mixture ranges from about 1.37 weight percent to about 1.5 weight percent.

7. A method as called for in claim 5 wherein the components are added in sufficient quantity such that the chloride-containing salt content of the reaction mixture ranges from about 0.47 weight percent to about 0.92 weight percent.

8. A method as called for in claim 5 further comprising adding an aqueous solution of at least one selected from the group consisting of ceric, vanadium and manganese ions.

9. A method as called for in claim 5 wherein said hydroperoxide is selected from the group consisting of inorganic hydroperoxide and t-butyl hydroperoxide.

10. A method as called for in claim 5 wherein said copolymerization is allowed to proceed for about one hour to about 200 hours and is terminated by the addition of a free radical scavenger.

11. A method as called for in claim 5, wherein said lignin and chloride salt are added to said solvent and then said 2-propenamide and 2-methyl-N7,N7-dimethyl-7-ammonium-3-oxo-4-oxyoct-1-ene chloride or methylsulfate are added.

12. A method as called for in claim 11, wherein said hydroperoxide is selected from the group consisting of t-butyl hydroperoxide and hydrogen peroxide.

13. A method as set forth in claim 5, wherein said solvent comprises an organic-water solvent mixture.

14. A method as called for in claim 4 further comprising increasing the molecular weight of said copolymer during polymerization which comprises effecting said polymerization in a reaction solvent which is a mixture of water and an organic solvent to allow said reaction to proceed in a gelated state.

15. The method according to claim 14, wherein said molecular weight is increased to a molecular weight ranging from about 15,000 to about 30,000,000.

16. The method according to claim 14, wherein said reaction occurs at about room temperature.

17. The method according to claim 14, wherein the amount of said solvent ranges from about 10 to about 50 volume percent water, and from about 90 to about 50 volume percent organic solvent.

18. A method as called for in claim 4 wherein said copolymerizing step is conducted utilizing from about zero molar percent to about 99 molar percent of 2-propenamide, and from about one molar percent to about 100 molar percent of 2-methyl-N7,N7-dimethyl-7-ammonium-3-oxo-4-oxyoct-1-ene chloride or methylsulfate.

19. A method as called for in claim 4 wherein said step of copolymerizing comprises: adding from about 0.32 to about 3.0 weight percent lignin, from about 0.0 to about 7.6 weight percent 2-propenamide, from about 0.1 to 11.0 weight percent of 2-methyl-N7,N7-dimethyl- 7-ammonium-3-oxo-4-oxyoct-1-ene with neutralizing anion, from about 0.6 to about 15.3 weight percent calcium chloride, from about 0.0 to about 6.1 weight percent aqueous solution of cerium (+IV), and from about 60 to about 97 weight percent solvent.

20. A method as called for in claim 5 wherein said solvent is selected from a group consisting of dimethyl sulfoxide, dimethyl acetamide, dimethyl formamide, 1,4-dioxine, 1-methyl-2-pyrrolidianone and pyridine.

21. A method as called for in claim 5 wherein said solvent is a mixture of at least one selected from the group consisting of dimethyl sulfoxide, dimethyl acetamide, dimethyl formamide, 1,4-dioxane, 1-methyl-2-pyrrolidianone, pyridine and water.

22. A method as called for in claim 4 wherein said anion is selected from a group consisting of chloride, methyl sulfate, bromide, nitrate and bicarbonate.

23. A method as called for in claim 4 wherein said copolymerization is allowed to proceed such that the total graft copolymer molecular weight is in the range of about 15,000 to 30,000,000.

24. The method for preparing a complex polymer of lignin which comprises:
  (a) adding a hydroperoxide to a solvent consisting of a mixture of fluids of differing polarity such that the total solvent is highly effective in dissolving monomers to be attached to the lignin; and
  (b) adding lignin, a chloride-containing salt, 2-propenamide and 2-methyl-N7,N7-dimethyl-7-ammonium-3-oxo-4-oxyoct-1-ene chloride or methylsulfate to said solution, thereby initiating free radical polymerization.

* * * * *